United States Patent
Dore et al.

(10) Patent No.: US 12,113,899 B2
(45) Date of Patent: Oct. 8, 2024

(54) ON DEMAND CODE DECRYPTION

(71) Applicant: Nagravision Sàrl, Cheseaux-sur-Lausanne (CH)

(72) Inventors: Laurent Dore, Cheseaux-sur-Lausanne (CH); Eric Piret, Cheseaux-sur-Lausanne (CH); Yasser Belaidi, Cheseaux-sur-Lausanne (CH); Brecht Wyseur, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 0 days.

(21) Appl. No.: 17/723,998

(22) Filed: Apr. 19, 2022

(65) Prior Publication Data

US 2022/0360442 A1    Nov. 10, 2022

Related U.S. Application Data

(63) Continuation of application No. 16/313,273, filed as application No. PCT/EP2017/066198 on Jun. 29, 2017, now Pat. No. 11,336,448.

(30) Foreign Application Priority Data

Jun. 29, 2016    (EP) .................................... 16305797

(51) Int. Cl.
*H04L 9/32*      (2006.01)
*G06F 21/14*    (2013.01)
(Continued)

(52) U.S. Cl.
CPC ................ *H04L 9/32* (2013.01); *G06F 21/14* (2013.01); *G06F 21/56* (2013.01); *G06F 21/602* (2013.01); *G06F 2221/033* (2013.01)

(58) Field of Classification Search
CPC ..... H04L 9/32; H04L 12/40104; G06F 21/14; G06F 21/56; G06F 21/602; G06F 2221/033
See application file for complete search history.

(56) References Cited

U.S. PATENT DOCUMENTS

| 6,463,538 B1 * | 10/2002 | Elteto | G06F 21/125 |
| | | | 713/190 |
| 2003/0179883 A1 * | 9/2003 | Uchida | G06F 21/14 |
| | | | 380/28 |

(Continued)

FOREIGN PATENT DOCUMENTS

WO    WO 2007/063433 A2    6/2007

OTHER PUBLICATIONS

International Search Report and Written Opinion issued Sep. 13, 2017 in PCT/EP2017/066198 filed Jun. 29, 2017.

(Continued)

*Primary Examiner* — Philip J Chea
*Assistant Examiner* — Sangseok Park
(74) *Attorney, Agent, or Firm* — Oblon, McClelland, Maier & Neustadt, L.L.P.

(57) ABSTRACT

A system and a method for protecting code are provided. Extraction of code to be protected takes place during an object-to-object transformation and that code is replaced with fake binary code. The extracted code to be protected may then be encrypted or otherwise obscured and stored in a separate region of an object file. A prior source-to-source file transformation can be provided to isolate and mark the code to be protected, and to inject additional source code to handle later decryption.

13 Claims, 6 Drawing Sheets

(51) Int. Cl.
*G06F 21/56* (2013.01)
*G06F 21/60* (2013.01)

(56) References Cited

U.S. PATENT DOCUMENTS

| | | |
|---|---|---|
| 2005/0198526 A1 | 9/2005 | Marr et al. |
| 2009/0232304 A1 | 9/2009 | King |
| 2012/0260102 A1* | 10/2012 | Zaks .................. G06F 21/71 |
| | | 713/189 |
| 2015/0363580 A1 | 12/2015 | Betouin et al. |
| 2016/0092871 A1 | 3/2016 | Gordon et al. |
| 2016/0180065 A1 | 6/2016 | Yi et al. |
| 2016/0218872 A1* | 7/2016 | Anderson .............. G06F 21/14 |
| 2016/0239671 A1* | 8/2016 | Salmon-Legagneur .................... |
| | | G06F 21/602 |
| 2017/0357815 A1* | 12/2017 | Malka ................. G06F 21/101 |
| 2019/0005233 A1 | 1/2019 | Schneider et al. |

OTHER PUBLICATIONS

European Office Action issued Nov. 10, 2020 in European Patent Application No. 17734089.0, 5 pages.
Communication Pursuant to Article 94(3) EPC issued Mar. 16, 2022 in EP Application No. 17734089.0.
Collberg, et al. "A Taxonomy of Obfuscating Transformations", Technical Report Department of Computer Science, University of Auckland, No. 148, Jul. 1, 1997, XP002140038, pp. 1-36.
Mavrogiannopoulos, et al. "A taxonomy of self-modifying code for obfuscation", Computers & Security, vol. 30, No. 8, Aug. 20, 2011, XP028106916, pp. 679-691.
Combined Chinese Office Action and Search Report issued Aug. 26, 2022 in Chinese Patent Application No. 201780047566.1 (with English translation), 10 pages.
Chinese Office Action issued Feb. 2, 2023 in Chinese Patent Application No. 201780047566.1 (with partial English Translation), 6 pages.

* cited by examiner

ON DEMAND CODE DECRYPTION

CROSS-REFERENCE TO RELATED APPLICATIONS

This application is a continuation of U.S. application Ser. No. 16/313,273, filed Dec. 26, 2018, which is a National Stage Entry of PCT/EP2017/066198, filed on Jun. 29, 2017, which claims priority to European Patent Application No. 16305797.9, filed Jun. 29, 2016, the entire contents of each of which are hereby incorporated by reference in their entirety.

FIELD

The present disclosure relates to a system and method for protecting code, for example by adopting a build process which facilitates on demand code decryption.

BACKGROUND

Software can be subject to malicious attack by external parties, such as reverse engineering attacks. In view of this, various techniques have been developed to protect software from such attacks.

An example of such a technique is known as "on-demand code decryption". According to this technique, some elements, or "chunks", of the code are delivered in an encrypted form. These are decrypted just prior to execution and then purged afterwards. This can in particular mitigate static analysis techniques which examine the code without executing it. Static analysis techniques include multiple variations and typically involve disassembling machine code.

Typically, on-demand encryption processes can be broadly summarised as comprising four steps. Firstly, the relevant binary code to be protected is extracted. Secondly, fake code is substituted in position of the protected binary code. Thirdly, the extracted binary code is then encrypted and added to a data section of the binary. The final binary is then finalized in such a way that the process of on-demand decryption is provided with the correct information to use. Conventionally, these steps are each carried out after the process of linking has been completed, and are thus carried out by the integrator.

DETAILED DESCRIPTION OF THE DRAWINGS

Figure 1:
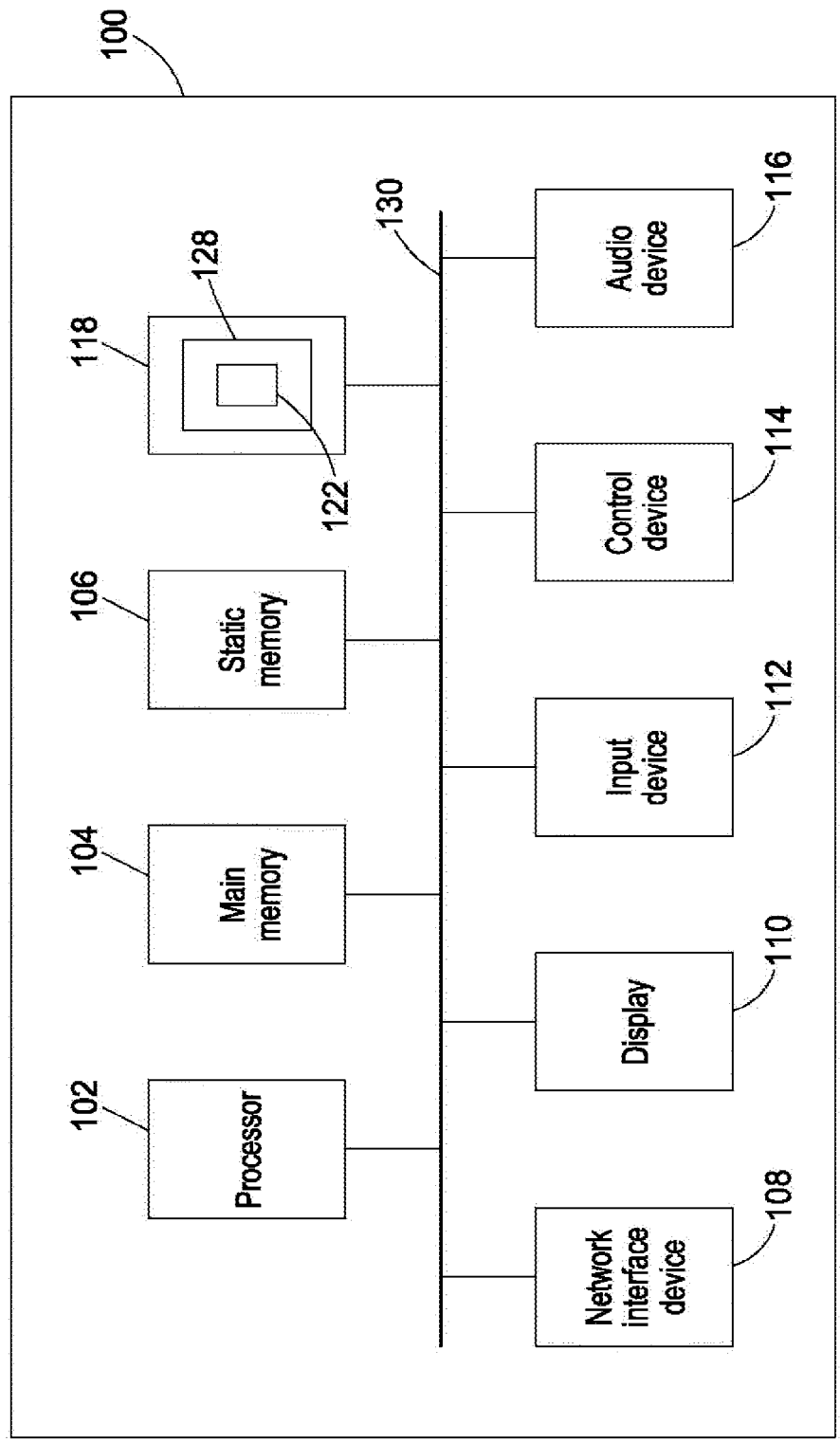
FIG. 1 shows a hardware infrastructure for implementing a preferred embodiment.

In overview, a system and a method for protecting code are provided. Extraction of code to be protected takes place during an object-to-object transformation and that code is replaced with fake binary code. The extracted code to be protected may then be encrypted or otherwise obscured and stored in a separate region of an object file. A prior source-to-source file transformation can be provided to isolate and mark the code to be protected, and to inject additional source code to handle later decryption.

In some aspects of the disclosure there is provided a method, for example a method for protecting code such as a computer-implemented method for protecting code. The method comprises carrying out an object-to-object file transformation. The object-to-object transformation comprises identifying code to be protected within an input object file for encryption and extracting the identified code to be protected. The object-to-object transformation further comprises replacing the identified code to be protected within the input object file with a fake code to generate a first output object file and injecting the code to be protected into a second output object file. The code to be protected may be encrypted or obscured using another technique prior to injection into the second output object file.

By carrying out an object-to-object transformation of this kind, a method may be provided which may avoid a requirement to carry out decryption at a later stage of the compilation process. For example, in contrast with approaches which rely on encryption at the linking stage carried out by the integrator when generating the final binary, the method of the present disclosure can allow code to be obscured without relying on full coordination of the integrator with the processes for generating source and object code. This is a more reliable to solution in many scenarios in which the integrator is independently operated to earlier coding/compiling processes. Improved reliability and security may be achieved by maintaining control of the obscuration process close to the source of the code. The fake code may be selected to resemble real code, thereby making the encryption process more difficult to detect. The identified code to be protected may be injected into a data region of the second output object file, which may further help to obscure its true nature.

In some embodiments, the first output object file and the second output object file may be consolidated into a final output object file. This may allow a one-to-one relationship between any input object files and output object files such that there is a minimal need to adjust later processing to take account of modifications during the object-to-object transformation.

In some embodiments, the method may further comprise, prior to the object-to-object transformation, carrying out a source-to-source transformation. The source-to-source transformation may comprise marking the code to be protected within an input source file. The source-to-source transformation may further comprise providing additional code to the input source file to provide instructions for a later decryption operation. Moreover, the source-to-source transformation may further comprise isolating the code to be protected. In this manner, the source-to-source transformation may allow necessary information for the object-to-object transformation to be integrated without deliberate operator action. Alternatively or additionally, the original source code may be provided with appropriate information.

In some embodiments, the object-to-object transformation may further comprise: identifying relocation directions within the input object file; excluding the relocation directions from replacement by the fake code. The relocation directions may be addresses to which relocations are addressed. By excluding these from the code to be protected, the process of relocation during the linking stage may be unaffected by the method. In effect, this may allow the code to be protected to call external functions at the linker/integrator despite not being visible to the linker/integrator since it is encrypted at that stage. In some embodiments, instead of excluding the relocation directions from replacement, the object-to-object transformation may comprise altering the target of one or more relocation directions. This may ensure the consistency of the decrypted code.

In some aspects of the disclosure, a computer program product is provided comprising computer executable instructions for carrying out the method described above. In further aspects, a system is provided for carrying out the method described above.

Some specific embodiments are now described by way of illustration with reference to the accompanying drawings in which like reference numerals refer to like features.

FIG. 1 illustrates a block diagram of one implementation of a computing device 100 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 100 includes a processing device 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a secondary memory (e.g., a data storage device 118), which communicate with each other via a bus 130.

Processing device 102 represents one or more general-purpose processors such as a microprocessor, central processing unit, or the like. More particularly, the processing device 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 102 may also be one or more special-purpose processing devices such as an application specific integrated circuit (ASIC), a field programmable gate array (FPGA), a digital signal processor (DSP), network processor, or the like. Processing device 102 is configured to execute the processing logic (instructions 122) for performing the operations and steps discussed herein.

The computing device 100 may further include a network interface device 108. The computing device 100 also may include a video display unit 110 (e.g., a liquid crystal display (LCD) or a cathode ray tube (CRT)), an alphanumeric input device 112 (e.g., a keyboard or touchscreen), a cursor control device 114 (e.g., a mouse or touchscreen), and an audio device 116 (e.g., a speaker).

The data storage device 118 may include one or more machine-readable storage media (or more specifically one or more non-transitory computer-readable storage media) 128 on which is stored one or more sets of instructions 122 embodying any one or more of the methodologies or functions described herein. The instructions 122 may also reside, completely or at least partially, within the main memory 104 and/or within the processing device 102 during execution thereof by the computer system 100, the main memory 104 and the processing device 102 also constituting computer-readable storage media.

Figure 2A:
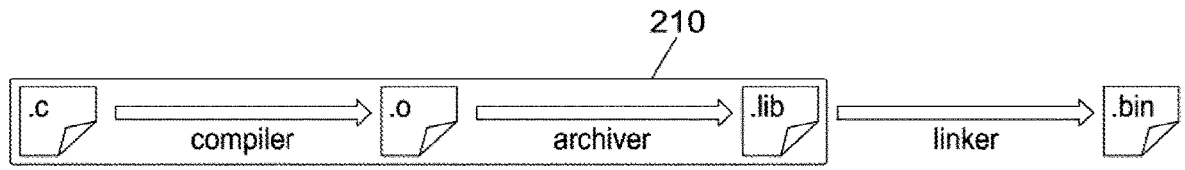
FIG. 2A illustrates a compiling process according to a known technique.

For comparative purposes, FIG. 2A illustrates the general steps of a known software build process. Here, source files ".c" are compiled by a compiler to create object files ".o". The object files are then archived by an archiver to form libraries ".lib" which are in turn linked by a linker (sometimes referred to as an integrator) to form a final binary file ".bin". Each of the complier, archiver and integrator may be implemented on a computing device 100 such as that described in FIG. 1. The archiver, compiler and integrator may each be implemented on an independent computing device 100, or any combination of the archiver, compiler and integrator may share a computing device upon which they are implemented. For example, the compiler and archiver may be integrated on a first computing device 100 and the integrator may be implemented on a second computing device 100. Where multiple computing devices 100 are provided, these may communicate over any appropriate communications network.

In many conventional scenarios the compiler and archiver may be under control of a first entity, while a second entity may aggregate libraries from multiple sources through implementation of a linker/integrator. Box 210 in FIG. 2A illustrates the entities under control of the first entity. Accordingly, when the binary .bin file is produced, multiple entities have had access to the code, increasing potential security risks as well as stability risks where coordination between entities is imperfect. The present disclosure provides a build process which mitigates such risks. In particular, this build process enables on-demand code decryption. Such a build process is illustrated in FIG. 2B.

Figure 2B:
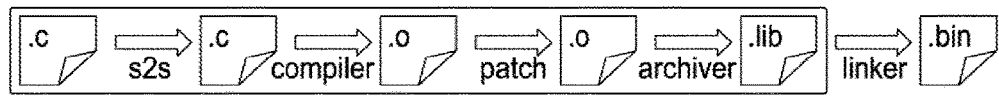
FIG. 2B illustrates a compiling process according to the preferred embodiment.

In comparison to FIG. 2A, FIG. 2B illustrates two additional build steps. Firstly, an "s2s" source-to-source transformation transforms an input source file .c into an output source file .c. This is then compiled by a compiler to form an object file in line with the process of FIG. 2A. This object file is then an input object file for an object-to-object transformation labelled as "patch" in FIG. 2B, which generates one or more output object files.

Figure 3:
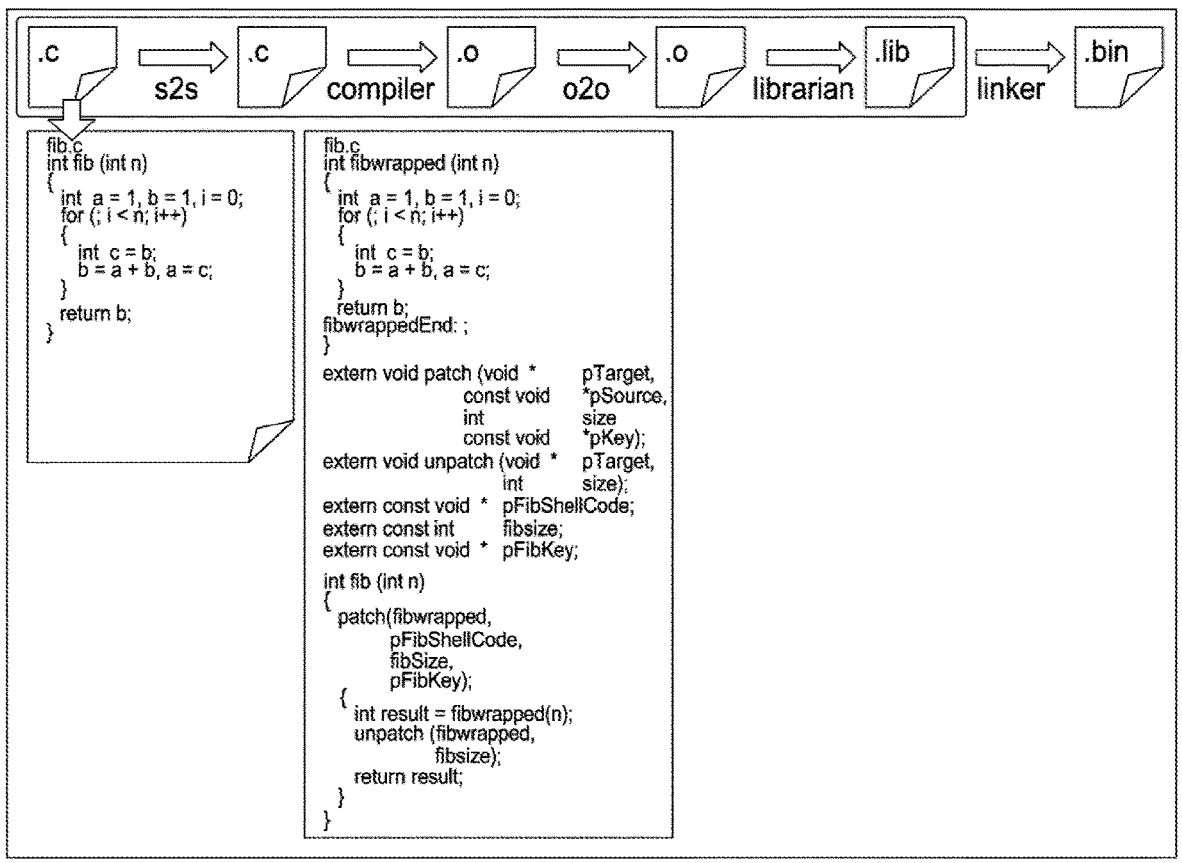
FIG. 3 illustrates a source-to-source transformation within the compiling process of the preferred embodiment.

The source-to-source transformation can be understood with reference to FIG. 3, which illustrates an example of such a process. In particular, the source-to-source transformation isolates and marks the code to be protected with markers. The operation "fibWrapped" identifies this code. Additionally, during this transformation additional code is incorporated to assist in handling the decryption operation. In some examples, an alternative process to encryption may be used to obscure the code to be protected, in which case the decryption operation will be replaced by a suitable alternative.

Figure 4:
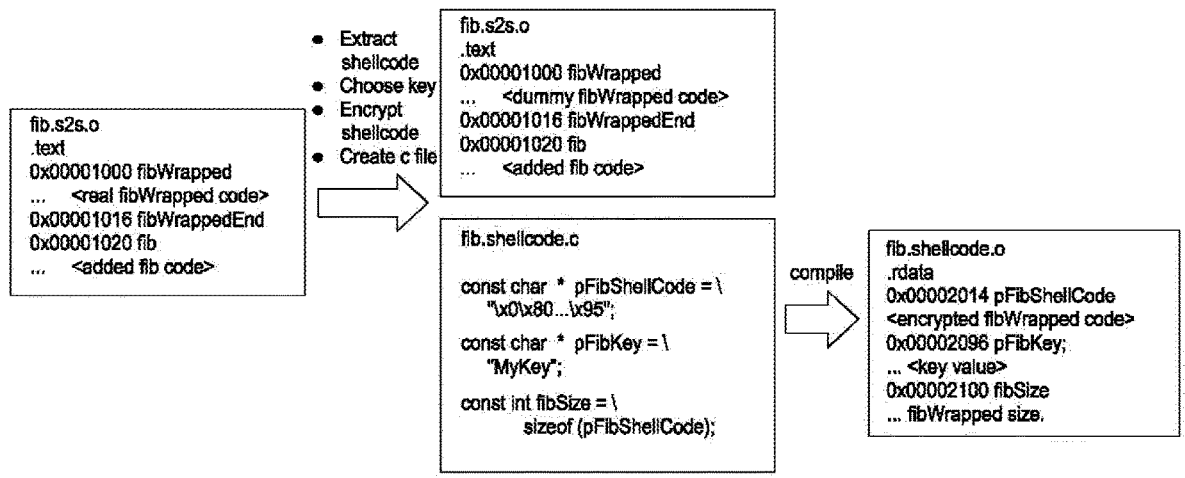
FIG. 4 illustrates an object-to-object transformation within the compiling process of the preferred embodiment.

FIG. 4 illustrates an example of the object-to-object transformation. Here input object file fib.s2s.o contains markers "fibWrapped" and "fibWrappedEnd" allowing the object-to-object transformation to identify the code to be protected. This code is extracted and replaced with fake code within the object file fib.s2s.o. The fake code can be selected to resemble real code, and may be, for example, junk code, real code or seemingly meaningful code. In other examples, the fake code may be random code. The modified object file fib.s2s.o may be considered a first output object file.

In addition, the object-to-object transformation may generate an intermediate source file fib.shellcode.c. This intermediate source file is used to encrypt the code to be protected using an encryption operation matching the decryption operation injected during the source-to-source transformation and a give secret key. The secret key may be pre-defined or may be defined such that it can be derived during the object-to-object transformation or at another time. The encryption operation may be replaced with an alternative form of obfuscation, which may be weaker, in order to minimize overheads and potential performance penalties.

The intermediate source file is compiled during the object-to-object transformation to generate a second output object file, referred to as "fib.shellcode.o" in FIG. 4. The second object file carries the encrypted or otherwise obscured code to be protected in a data section.

The first and second object files may subsequently be consolidated to form a single, consolidated output object file, although this is not required in all embodiments. In this manner, a one-to-one relationship may be achieved between object files used as an input to the object-to-object transformation and those that are output from this process. The approach to object file consolidation will vary in dependence on the toolchain. In some examples, a COFF-format parser may be developed and the process may involve reading both object files, consolidating them according to the Microsoft COFF specification and writing the consolidated file back to disk. In other examples, there may be toolchain-provided tools to carry out this consolidation.

The object file(s) generated by the process of FIGS. 2B, 3 and 4 can then be passed to an integrator/linker for linking. The integrator does not need to take further steps to ensure that on-demand decryption is possible and does not need to carry out any post-link process. Furthermore, since the code delivered to the integrator is already encrypted, static analysis of the library at this stage is inhibited, increasing the security of the code.

Figure 5:
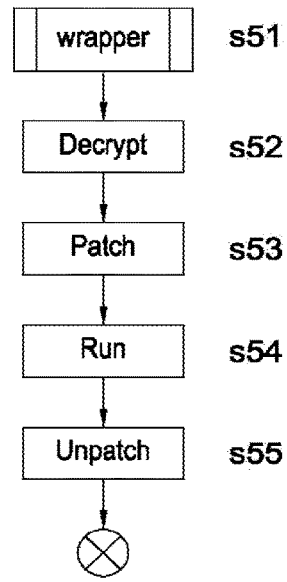
FIG. 5 shows a flow chart of an on-demand decryption process.

FIG. 5 illustrates a process of on-demand decryption subsequently carried out when the software is run. Firstly, ultimate .bin binary wrapper is obtained at step s51 and the relevant function code (i.e. the code that has been protected) can be retrieved. This is decrypted at step s52 and then patched at step s53 into its source location, replacing the fake code that had been located there. The program may then be run, at step s54. Subsequently, the function code is unpatched at step s55, once again obscuring this code from static analysis.

During the patching step s53, certain areas may be preserved, particularly areas modified by the linker after encryption was completed. An example process will be described in more detail below with reference to FIGS. 6 to 8. At link step, the linker modifies the code, updating offsets in CALL instructions to the relevant target functions. As this cannot be pre-computed in the encrypted code, in this approach described below with reference to FIGS. 6 to 8, these are anticipated, such areas are identified prior to encryption, and then preserved so that the result after patching is a proper, correct code. An alternative approach might involve a process of obfuscation OBF, and its symmetric UNOBF, that would work with the linker so that LINK(area)=UNOBF(LINK(OBF(area))); this alternative may avoid the requirement to preserve areas.

Figure 6:
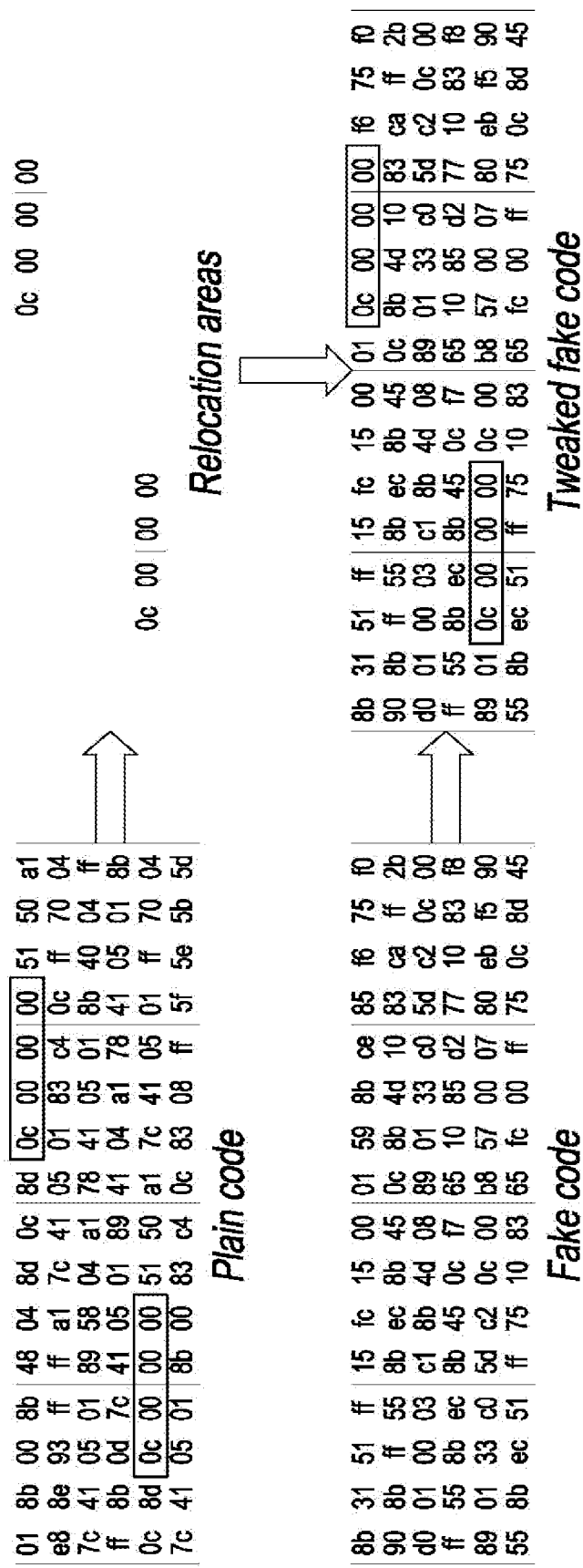
FIG. 6 shows areas of the code from processing which are to be excluded as relocation directions.
Figure 7:
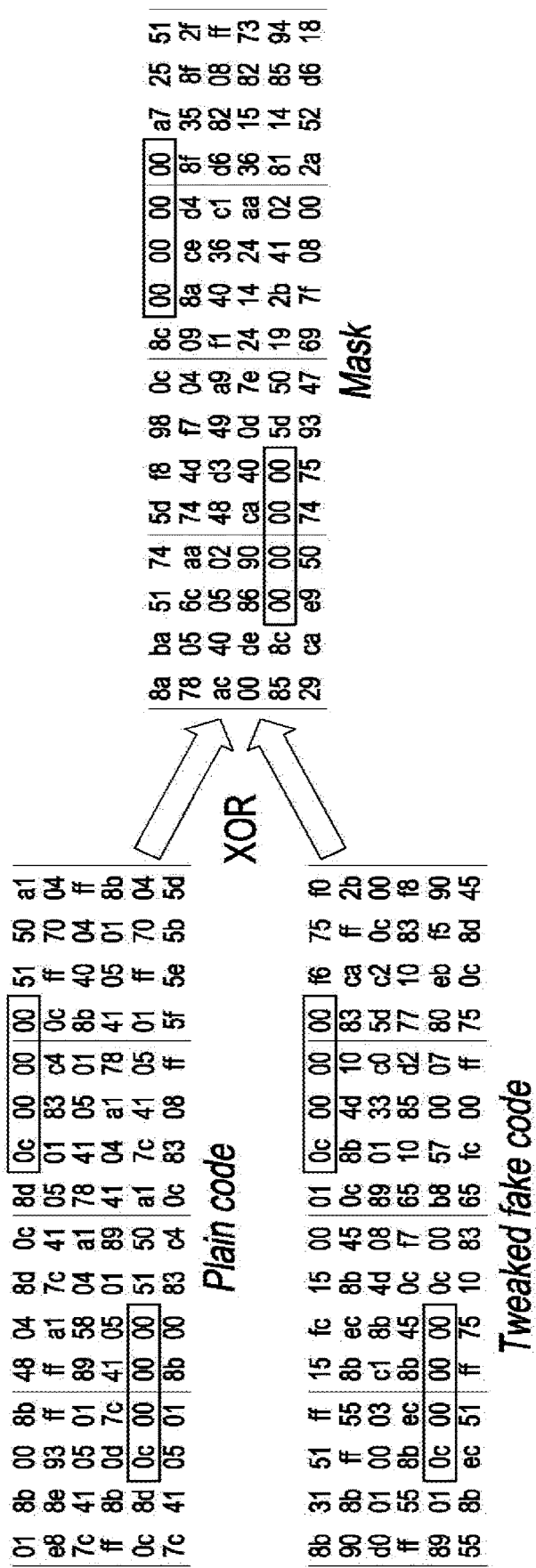
FIG. 7 shows generation of a mask to be applied to protect excluded areas during on-demand code decryption.
Figure 8:
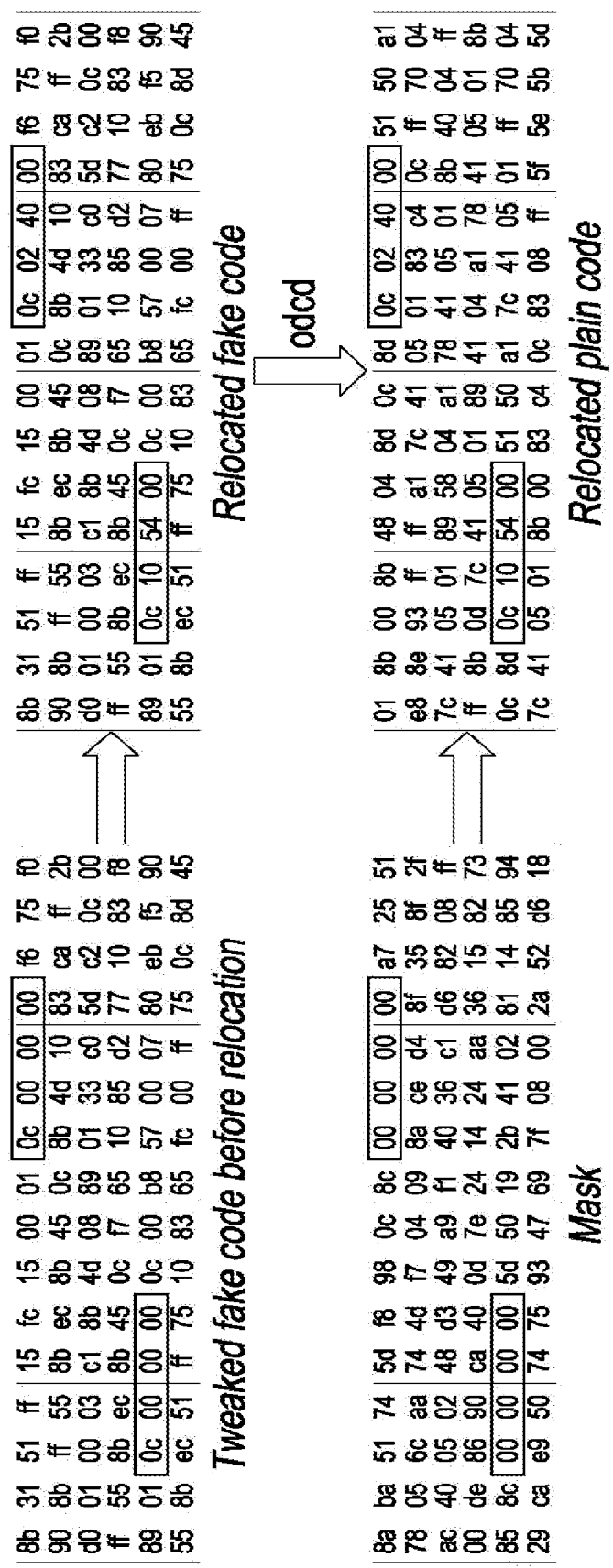
FIG. 8 illustrates a process of on-demand code decryption that does not influence relocation addresses.

As mentioned above, further details of some preferred embodiments are illustrated in FIGS. 6 to 8. Here it is recognized that relocation processes may require unaltered code. Such relocation processes can occur during the linking process and when the program is loaded. In order to avoid interference with this process, during the object-to-object transformation areas which are used for relocation directions can be excluded from replacement by the fake code. In particular, the areas used for relocation directions may be areas targeted by relocation commands.

FIG. 6 illustrates an example. The original, "plain" code in the input object file includes two highlighted regions which are the target of relocation operations. The fake code is modified so that these regions are not replaced and values remain constant in these regions.

A mask may then be generated to ensure any data provided to the regions during relocation is not overwritten during the on-demand decryption process at run-time. The mask may be generated by comparison of the (decrypted) code to be protected and the equivalent area within the output object file. This is illustrated in FIG. 7; an XOR operation identifies where the two sets of code are identical, thus indicating where no substitution has been made.

Relocations occur during linking and loading processes, as illustrated in FIG. 8. The mask is then utilized to ensure that during the on-demand decryption process these relocations remain effective by inhibiting the patching of the code that has been protected into the regions reserved for such relocations.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 110 in relation to FIG. 1) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "replacing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of protecting code comprising:
   identifying code to be protected in an input object file;
   extracting the identified code to be protected from the input object file;
   deleting the identified code from the input object file;
   replacing the identified code with fake junk code to generate a first output object file, the fake junk code being non-randomized code, the first output object file including markers identifying the fake junk code; and
   injecting the identified code into a second output object file,
   such that decryption is avoided in a compilation process and wherein the identified code is encrypted or obscured prior to injection into the second output object file.

2. The method according to claim 1, further comprising consolidating the first output object file and the second output object file into a final object file.

3. The method according to claim 1, further comprising:
   identifying relocation directions within the input object file; and
   excluding the relocation directions from replacement by the fake junk code.

4. The method according to claim 1, wherein the fake junk code is selected to resemble real code.

5. The method according to claim 1, further comprising encrypting the identified code to be protected.

6. The method according to claim 1, wherein the identifying identifies the code to be protected in the input object file using the markers.

7. The method according to claim 6, wherein the markers result from the code to be protected being marked in an input source file.

8. The method according to claim 1, wherein the replacing replaces the identified code with the fake junk code within the markers in the input object file.

9. A system for protecting code, the system comprising:
   processing circuitry that carries out an object-to-object file transformation by being configured to:
      identify code to be protected in an input object file,
      extract the identified code to be protected from the input object file,
      delete the identified code from the input object file,
      replace the identified code with fake junk code in the input object file to generate a first output object file, the fake junk code being non-randomized code, the first output object file including markers identifying the fake junk code, and
      inject the identified code into a second output object file,
   such that decryption is avoided in a compilation process and wherein the identified code is encrypted or obscured prior to injection into the second output object file.

10. The system according to claim 9, wherein the processing circuitry is further configured to consolidate the first output object file and the second output object file in to a final object file.

11. The system according to claim 9, wherein to perform the object-to-object transformation, the processing circuitry is further configured to:
    identify relocation directions within the input object file; and
    exclude the relocation directions from replacement by the fake junk code.

12. The system according to claim 9, wherein the fake junk code is selected to resemble real code.

13. The system according to claim 9, wherein to perform the object-to-object transformation, the processing circuitry is further configured to encrypt the identified code to be protected.

* * * * *